(12) United States Patent
Hanak et al.

(10) Patent No.: US 12,024,676 B2
(45) Date of Patent: *Jul. 2, 2024

(54) ORGANIC ACID SURFACTANT BOOSTER FOR CONTAMINANT REMOVAL

(71) Applicant: Halliburton Energy Services, Inc., Houston, TX (US)

(72) Inventors: Vincent Andrew Hanak, Plantersville, TX (US); Chad Kiser, Santa Fe, TX (US); Richard Saulnier, Needville, TX (US); Ronald Bosch, Houston, TX (US); George Anderson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/902,114

(22) Filed: Sep. 2, 2022

(65) Prior Publication Data

US 2023/0081029 A1    Mar. 16, 2023

Related U.S. Application Data

(60) Provisional application No. 63/244,621, filed on Sep. 15, 2021.

(51) Int. Cl.
*C09K 8/00* (2006.01)
*C09K 8/60* (2006.01)
(Continued)

(52) U.S. Cl.
CPC ............... *C09K 8/602* (2013.01); *C09K 8/74* (2013.01); *C10G 17/02* (2013.01); *E21B 43/35* (2020.05);
(Continued)

(58) Field of Classification Search
CPC ............. C10G 17/02; C10G 2300/205; C10G 2300/4075
See application file for complete search history.

(56) References Cited

U.S. PATENT DOCUMENTS

| | | |
|---|---|---|
| 7,497,943 B2 | 3/2009 | Nguyen et al. |
| 10,947,626 B2 | 3/2021 | Pinder et al. |

(Continued)

FOREIGN PATENT DOCUMENTS

| | | | |
|---|---|---|---|
| CA | 2875938 A1 * | 12/2013 | ......... B01D 17/0208 |
| EP | 2038512 B1 | 10/2011 | |

(Continued)

OTHER PUBLICATIONS

Baker Hughes, Excalibur 7760 additive, remove metals and tramp amines during desalting, 2021.

(Continued)

*Primary Examiner* — Prem C Singh
*Assistant Examiner* — Brandi M Doyle
(74) *Attorney, Agent, or Firm* — Thomas Rooney; C. Tumey Law Group PLLC

(57) ABSTRACT

Compositions and methods for use in treating hydrocarbon liquids are provided. Specifically, the compositions and methods of the present disclosure relate to additives including betaine and one or more organic acids. In some embodiments, an additive comprising betaine and an organic acid may be added to a hydrocarbon liquid. In certain embodiments, the additive may be added to a hydrocarbon liquid prior to a processing operation.

16 Claims, 3 Drawing Sheets

(51) Int. Cl.
*C09K 8/74* (2006.01)
*C10G 17/02* (2006.01)
*E21B 43/34* (2006.01)
*E21B 43/36* (2006.01)
*E21B 43/38* (2006.01)

(52) U.S. Cl.
CPC .............. *E21B 43/36* (2013.01); *E21B 43/38* (2013.01); *C10G 2300/205* (2013.01); *C10G 2300/4075* (2013.01)

(56) References Cited

U.S. PATENT DOCUMENTS

| | | |
|---|---|---|
| 2004/0045875 A1 | 3/2004 | Nguyen et al. |
| 2005/0004239 A1 | 1/2005 | Bull et al. |
| 2006/0102349 A1 | 5/2006 | Brady et al. |
| 2008/0217012 A1 | 9/2008 | Delorey et al. |
| 2009/0152164 A1 | 6/2009 | Nguyen et al. |
| 2011/0068049 A1* | 3/2011 | Garcia, III .............. C10G 17/09 208/252 |
| 2011/0120913 A1* | 5/2011 | Snawerdt ............... C10G 17/04 208/252 |
| 2011/0146997 A1 | 6/2011 | Nguyen et al. |
| 2012/0187049 A1 | 7/2012 | Nguyen et al. |
| 2013/0306522 A1 | 11/2013 | McDaniel |
| 2020/0071265 A1* | 3/2020 | Dhawan ................ C07C 231/12 |
| 2020/0354839 A1 | 11/2020 | Pinder et al. |
| 2021/0207018 A1 | 7/2021 | Ngo et al. |
| 2022/0041941 A1 | 2/2022 | Bosch et al. |
| 2023/0079788 A1 | 3/2023 | Hanak et al. |

FOREIGN PATENT DOCUMENTS

| | | |
|---|---|---|
| KR | 10-1340718 B1 | 12/2013 |
| WO | 2011037832 A2 | 3/2011 |
| WO | 2021/066798 A1 | 4/2021 |

OTHER PUBLICATIONS

International Search Report and Written Opinion for PCT/US2022/042898 dated Dec. 27, 2022.
International Search Report and Written Opinion for International Application No. PCT/US2022/042900 dated Jan. 9, 2023.

* cited by examiner

ORGANIC ACID SURFACTANT BOOSTER FOR CONTAMINANT REMOVAL

BACKGROUND

Hydrocarbons, such as oil and gas, may be obtained from subterranean formations that may be located onshore or offshore. The development of subterranean operations and the processes involved in removing hydrocarbons from a subterranean formation typically involve different steps such as, for example, drilling a wellbore at a desired well site, treating the wellbore to optimize production of hydrocarbons, and performing the necessary steps to produce and process the hydrocarbons from the subterranean formation.

After the hydrocarbons have been produced, they may be sent to one or more crude oil refineries for further processing. A refinery may include a tank farm or storage area where feed stocks, e.g., crude oil, shale oil, coal oil, and certain intermediate hydrocarbon streams from the refining processes may be stored for utilization in the refinery. These feedstocks may contain contaminants that occur either naturally or due to additives that are added to refinery feedstock before being processed in the refinery. The amounts of these contaminants vary depending upon the crude oil and its processing. Refining operations may encounter issues that reduce efficiency of operations due to these contaminants. In some instances, these issues are managed by the addition of organic acids prior to desalting the refinery feed stock. The addition of these organic acids may result in issues in downstream refinery processes but is considered necessary because these side effects are less problematic than the problems created by the contaminants.

For instance, calcium, present as organically bound compounds, is not easily dissociated, or removed by conventional water washing or desalting processes. These calcium compounds quickly decompose during typical catalytic operations, such as during hydro processing or during fluid catalytic cracking. These decomposed calcium compounds cause rapid fouling or deactivation of the catalysts in the catalytic operation. Therefore, it is desirable to remove these compounds before additional processing.

Amines, such as morpholine and methoxypropylamine, are used to control or inhibit corrosion within the distillation unit in the refinery. However, the hydrochloride salts of these amines tend to form deposits in distillation columns, overhead lines, and in overhead heat exchangers causing both fouling and corrosion problems. Therefore, it is desirable to remove amines as well. In addition, amine may be present in the crude oil processed by the refinery from upstream operations such as gas sweetening or other process additives and the degradation products of those additives.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
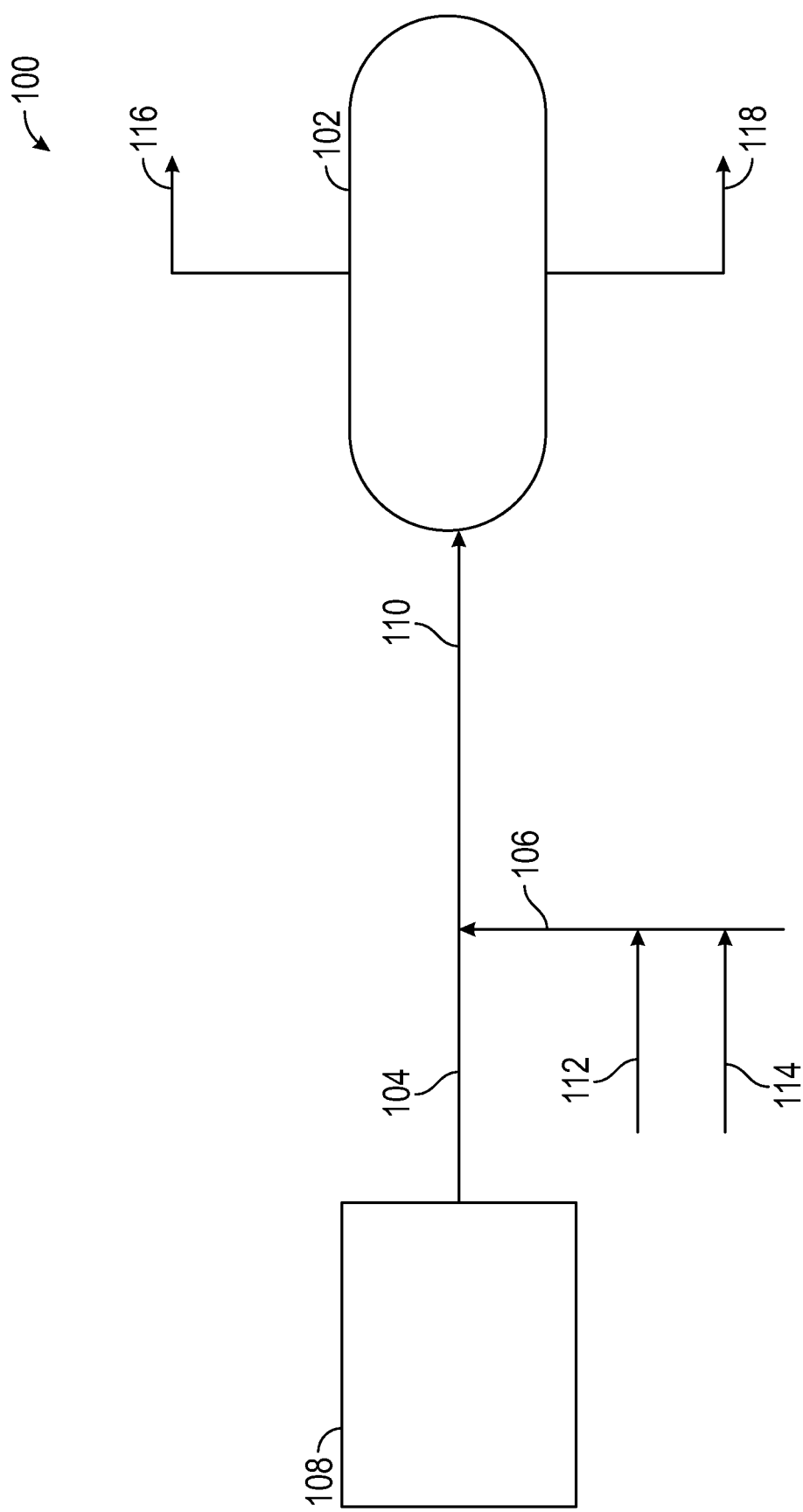
FIG. 1 is a flow diagram illustrating contaminant removal in a desalting process in accordance with some embodiments of the present disclosure.

Disclosed herein are extraction methods and systems to remove contaminants in refinery processes and, more particularly, disclosed are synergistic additives and methods of use for metals and/or amine removal from hydrocarbon liquids. Specifically, the synergistic additives include an organic acid and an organic acid surfactant booster.

A person of skill in the art with the benefit of this disclosure will understand that the additives of the present disclosure may be inserted into a hydrocarbon liquid at any suitable location. For example, the additives may be added into a hydrocarbon liquid in a crude oil refinery at any suitable point in the refinery process. In one or more embodiments, the additives may be inserted into the hydrocarbon liquid at a point before desalting has occurred, or prior to the water wash. In some embodiments, the additive may be inserted into the hydrocarbon liquid in the storage tank. In another embodiment, the additive may be inserted into the wash water prior to its introduction to the crude oil. In some embodiments, the additives of the present disclosure may be inserted using any chemical insertion methods. For example, in some embodiments, the additives may be inserted using one or more pumps, nozzles, tubing, piping, and other associated equipment. In some embodiments, the additives may be inserted using a distributed control system. In other embodiments, the additives may be inserted using a manual control system.

In one or more embodiments involving a crude oil refinery, the hydrocarbon liquid (e.g., crude oil) may be pumped from a storage tank to a crude oil unit for processing. In a refinery, the hydrocarbon liquid (e.g., crude oil) may be first treated in one or more desalters. Desalting is a process that is used to remove contaminants, primarily inorganic salts, from crude oil prior to refining. The desalting step is provided by adding and mixing with the crude oil a few volume percentages of fresh water to contact brine and salt. More particularly, desalting is necessary to remove salts and other inorganic materials that may cause fouling and deposits in downstream heat exchanger(s) and/or form corrosive salts detrimental to crude oil processing equipment. Further, these metals may act as poisons to the catalysts used in downstream refinery units. Therefore, desalting can reduce product contamination, system fouling, corrosion, and/or distillation column damage. In some embodiments, a method of the present disclosure comprises introducing one or more organic acids and one or more organic acid boosters into a hydrocarbon liquid for the purpose of increasing the efficiency of contaminant removal from oil to the water phase in refining operations related to desalting the hydrocarbon liquid.

The organic acid introduced into the hydrocarbon liquid may be any of a variety of suitable organic acids. Examples of suitable organic acids include acetic acid, citric acid, formic acid, maleic acid, glycolic acid, oxalic acid, lactic acid, uric acid, malic acid, and tartaric acid, and any combination thereof. The organic acid may be included in the hydrocarbon liquid in any suitable amount for contaminant removal, including an amount of about 0.001% to about 2% by weight of the hydrocarbon liquid. In some embodiments, the organic acid may be included in the hydrocarbon liquid in an amount of about 0.001% to about 0.5% by weight of the hydrocarbon liquid. This invention relates specifically to increasing the efficiency of that removal by the discovery of the synergistic effect between the surfactant and the organic acid used. In addition, this acid may be included directly in the wash water prior to its introduction to the hydrocarbon liquid at a calculated rate to meet the above treatment ranges.

The organic acid surfactant booster may generally include surfactants that improve the contaminant removal efficacy of the organic acid. Examples of suitable organic acid surfactant boosters include betaine, phosphate esters, quaternary amines, polyols, complex polyols esters, sulfonates, sulfosuccinates, thiophosphate esters, alcohol alkoxylates, and sorbitan monooleates. The selection of the particular organic acid surfactant booster depends on a number of factors, including molecular weight, conformation of the surfactant booster as it relates to the molecular weight of the organic acid, the type of contaminant in the hydrocarbon liquid, and the physics of the mixing regime in the vessel in which the transfer to the water phase occurs. The organic acid surfactant booster can be included in the hydrocarbon liquid in any suitable amount for contaminant removal, including an amount of about 0.001% to about 2% by weight of the hydrocarbon liquid. In some embodiments, the organic acid booster may be included in the hydrocarbon liquid in an amount of about 0.001% to about 0.5% by weight.

In certain embodiments, the organic acid surfactant booster may include a betaine. Examples of suitable betaines include cocamidopropyl betaines or ([3-(dodecanoylamino)propyl] (dimethyl)ammonio) acetate and similar common surfactants such as alkyl betaines, alkyl amidopropyl betaines, alkylamidobetaine, oleoamidopropyl betaines, and any derivative and combination thereof. In some embodiments, the betaine is present in an amount of about 0.001% to about 0.1% by weight of the hydrocarbon liquid. It should be understood that the synergy is best at lower betaine concentrations with the synergistic effect first being diluted by the replacement of the acid as the concentration increases, and then the betaine becoming antagonistic as the betaine approaches concentration sufficient to cause emulsification.

In certain embodiments, the organic acid surfactant booster may include thiophosphate esters such as poly(oxy-1,2-ethanediyl), α-(nonylphenyl)-Ω-hydroxy-phosphate and 2-ethylhexan-1-ol, phosphoric acid and similar surfactants. In some embodiments, the thiophosphate ester is present in an amount of about 0.03% to about 0.3% by weight of the hydrocarbon liquid. It should be understood that the synergy is best at lower thiophosphate ester concentrations with the synergistic effect first being diluted by the replacement of the acid as the concentration increases, and then the thiophosphate ester becoming antagonistic as the thiophosphate ester approaches concentration sufficient to cause emulsification.

In certain embodiments, the organic acid surfactant booster may include quaternary amines such as N-alkyl-N-benzyl-N,N-dimethyl ammonium chloride and benzyl dodecyl dimethyl ammonium bromide, ethylene bis (hexadecyl trimethyl ammonium chloride), and similar surfactants. In some embodiments, the quaternary amine is present in an amount of about 0.01% to about 0.1% by weight of the hydrocarbon liquid. It should be understood that the synergy is best at lower quaternary amine concentrations with the synergistic effect first being diluted by the replacement of the acid as the concentration increases, and then the quaternary amine becoming antagonistic as the quaternary amine approaches concentration sufficient to cause emulsification. For instance, above a molar ratio of 5% of surfactant to organic acid, antagonistic effects appear.

In certain embodiments, the organic acid surfactant booster may include polyols such as the following examples of polyols resulting from reactions with molecules having two or more chains, each of which has an end hydroxyl group and consists of units of propylene or ethylene linked together by ether. Such products are polypropylene glycol, polyethylene glycol, adducts of glycerol and other polyhydric alcohols with propylene oxide or ethylene oxide, adducts of carbohydrate or amines with such oxides and the like having molecular weights between 300 and 3000 Daltons. Many of these are antagonistic to contaminant removal, and caused immediate emulsions, but some are moderately effective at increasing the removal percentages. For instance, the ratio of ethylene oxide to propylene oxide may drive the antagonistic effect. More particularly, triols have an antagonistic effect when more than 30% ethylene oxide are present. In some embodiments, the polyol is present in an amount of about 0.01% to about 1% by weight of the hydrocarbon liquid.

In certain embodiments, the organic acid surfactant booster may include complex polyol esters containing the above polyols esterified with maleic anhydride, fumaric acid, and/or acrylic acid.

In certain embodiments, the organic acid surfactant booster may include sulfonates such as linear and branched dodecyl benzene sulfonic acids and alkyl naphthalene sulfonic acids and their amine and mineral salts. In some embodiments, the sulfonates are present in an amount of about 0.02% and to about 2% by weight of the hydrocarbon liquid. At low concentrations, the sulfonates are synergistic with the organic acid, but have exceptionally narrow ratios before becoming antagonistic.

In certain embodiments, the organic acid surfactant booster may include sulfosuccinates such as dioctyl sulfosuccinate and disodium 4-(oleamido mipa)-sulfosuccinate and similar surfactants. In some embodiments, the sulfosuccinates are present in an amount of about 0.02% to about 2% by weight of the hydrocarbon liquid. At low concentrations, the sulfosuccinates are synergistic with the organic acid, but have exceptionally narrow ratios before becoming antagonistic. For instance, at surfactant to acid molar ratios between about 0.5% to about 5%, there are antagonistic effects.

In certain embodiments, the organic acid surfactant booster may include thiophosphate esters and thiophosphates such as di-butyl thiophosphate ester, butyl thiophosphate ester, 2-ethyl hexane thiophosphate and tributyl thiophosphate. In some embodiments, the thiophosphate esters and/or thiophosphates are present in an amount of about 0.001% to about 0.5% by weight of the hydrocarbon liquid.

In certain embodiments, the organic acid surfactant boosters may include alcohol alkoxylates such as alcohols, $C_{13-15}$-branched and linear alcohol, butoxylated alcohol, propoxylated alcohol and/or ethoxylated alcohol and sorbitan monooleate.

The organic acid and organic acid surfactant booster may be used at any suitable mole ratio. The organic acid surfactant booster should be included in an amount sufficient for partitioning contaminants from the oil phase to the water phase in refinery desalters. By way of example, suitable ratios include an organic acid surfactant booster to organic acid mole ratio of about 0.01 to 1, about 0.1 to 1, or about 0.5 to 1. In some embodiments, the organic acid surfactant booster and organic acid are provided in an additive that is added to a hydrocarbon liquid and/or a water feed. In other embodiments, the organic acid booster and organic acid are separately introduced into the hydrocarbon liquid and/or a water feed.

Among the many potential advantages to the methods and compositions of the present disclosure, only some of which are alluded to herein, the methods and compositions of the present disclosure may provide improved performance in the removal of unwanted contaminants in the hydrocarbon liquid. For example, in certain embodiments, the organic acid surfactant booster may have a synergistic effect with the organic acid, such that less organic acid is necessary to achieve the same level of contaminants removal in the hydrocarbon liquid than the amount of organic acid that would be necessary without the betaine. This may reduce the potential issues that can be caused by organic acid injection and may reduce costs typically associated with those issues. In certain embodiments, no deleterious effects can be found from this additive in either the refinery product or the downstream water treatment. Without intending to be limited to any particular theory or mechanism, it is believed that in some embodiments the synergy of the organic acid surfactant booster with the organic acids may be more effective at removing contaminants from hydrocarbon liquid than either the betaine or organic acid alone.

Hydrocarbon liquids such as petroleum crudes, gas oil, etc. are subjected to various processes to isolate and separate different fractions of the feed stock. In refinery processes, the hydrocarbon liquid is distilled to provide light hydrocarbons, gasoline, naphtha, kerosene, gas oil, etc. The hydrocarbon liquids are usually contaminated from several sources, including, but not limited to brine, minerals, clay, silt, sand, metals including calcium, zinc, silicon, nickel, sodium, potassium, nitrogen-containing compounds such as amines used as neutralizers in crude unit overhead systems and from $H_2S$ scavengers used in the oilfield, iron sulfides and iron oxides resulting from pipeline and vessel corrosion during production, transport, and storage. The hydrocarbon liquid may also contain non-hydrocarbon liquids but should predominately comprise hydrocarbons. Prior to the refinery processes, desalting is necessary to remove these salts and other inorganic materials that would otherwise cause fouling and deposits in downstream heat exchanger equipment and/or form corrosive salts detrimental to crude oil processing equipment. Further, these metals can act as poisons for the catalysts used in downstream refinery units. Desalting is the resolution of the natural emulsion in which a wash water is dispersed into the hydrocarbon liquid (e.g., crude oil, etc.) using a mix valve. The wash water may be added at any suitable concentration, for example, from about 3% to about 10% by weight of the resulting emulsion or about 5% by weight of the emulsion. The emulsion mix is directed into a desalter vessel containing a parallel series of electrically charged plates. Under this arrangement, in some embodiments, the oil and water emulsion is exposed to the applied electrical field. For example, an induced dipole is formed on each water droplet into larger and larger droplets. Eventually, the emulsion resolves into two separate phases, the oil phase being the top layer and the water phase being the bottom layer. The streams of desalted crude oil and effluent water are separately discharged from the desalter. In some embodiments, the entire desalting process is a continuous flow as opposed to a batch process. Normally, chemical additives are injected before the mix valve to help resolve the oil/water emulsion. These additives effectively allow small water droplets to coalesce more easily by lowering the oil/water interfacial tension.

In certain embodiments, the contaminants in the hydrocarbon liquid may include, but are not limited to calcium and calcium salts, calcium naphthenates, primary amines, secondary amines, and the like, and any combination thereof. In certain embodiments, the additive of the present disclosure may reduce the total amount of the additive necessary to achieve a suitable reduction of both calcium naphthenate and monoethanol amine in refinery feedstocks by promoting these species partitioning in normal refinery desalting to the water phase of the desalters. The extraction methods and systems comprise separation of at least a portion of contaminants from the hydrocarbon liquid using at least one or more organic acids and/or one or more organic acid surfactant boosters to remove contaminants, such as amines and calcium from the hydrocarbon liquid. Alternatively, or additionally, the method of contaminant removal comprises introducing one or more organic acids and one or more organic acid surfactant boosters into a water feed, combining at least the water feed and the hydrocarbon liquid and separating salts from the hydrocarbon liquid, wherein the separating salts further remove at least amines and calcium from the hydrocarbon liquid. Further, the extraction method and system remove the amines from the hydrocarbon liquid in an amount of about 50% or more, or about 60% or more, or about 70% or more, or about 80% or more, or about 90% or more, by weight of the hydrocarbon liquid and removes the calcium from the hydrocarbon liquid in an amount of about 30% or more, or about 40% or more, or about 50% or more, or about 60% or more, or about 70% or more, or about 80% or more, or about 90% or more, by weight of the hydrocarbon liquid.

FIG. 1 illustrates a system 100 for contaminant removal from a hydrocarbon liquid with a desalter 102. As mentioned above, a goal of the desalter unit may be to remove salt from the connate water associated with the hydrocarbon liquid. In practice, this often includes adding additional water to the hydrocarbon liquid to dilute the concentration of salt. As illustrated in FIG. 1, hydrocarbon stream 104 and water stream 106 may be contacted and mixed to provide the necessary dilution. Hydrocarbon stream 104 includes a hydrocarbon liquid from storage tank 108. Although not illustrated in FIG. 1, there may be a mixing valve or other mixing means disposed upstream of the mixing point between hydrocarbon stream 104 and water stream 106. In addition, one or more heat exchangers may also be used to heat the hydrocarbon stream 104 and/or the water stream 106. The mixing of the hydrocarbon liquid from hydrocarbon stream 104 and water from water stream 106 may cause emulsification of the hydrocarbon liquid and water and a mixed hydrocarbon-water stream 110 containing hydrocarbon and water may enter an inlet of crude oil desalter 102. As illustrated, an organic acid 112 and organic acid surfactant booster 114 may be added to the hydrocarbon liquid. In FIG. 1, the organic acid 112 and organic acid surfactant booster 114 are added to the water stream 106 then mixed with the hydrocarbon liquid from the storage tank 108 before a desalter 102 and after the storage tank 108. While in many embodiments, the organic acid 112 and organic acid surfactant booster 114 are added to the water stream 106 prior to its introduction to the hydrocarbon stream 104 and mixes in the mix valve in front of the desalter vessel 102, the organic acid 112 and organic acid surfactant booster 114 of a water stream 106 may alternatively be mixed with the hydrocarbon liquid at other suitable locations, including addition directly to the desalter 102, addition to the storage tank 108, or addition to the mixed hydrocarbon-water stream 110. As previously described, the organic acid 112 and organic acid surfactant booster 114 should interact with contaminants in the hydrocarbon liquid to facilitate their subsequent removal.

Additional chemical additives may also be added to the hydrocarbon liquid to treat or control or otherwise keep one or more process variables within an operational envelope. Some chemical additives may include, without limitation, demulsifiers such as epoxy resins, acid or base catalyzed phenol-formaldehyde resins, poly ethylenimines, polyamines, dendrimer, di-epoxides, or polyols, for example. There may be many other demulsifiers not specifically mentioned herein that would be suitable for use in the demulsifying application. For example, chemical additive may include, but is not limited to, a primary emulsion breaker, an adjunct breaker, a solid wetting agent, an acidifying agent, an asphaltene stabilizer, a water clarifier and iron chelating agent, or any combinations thereof. Additionally, there may be multiple pumps fluidically coupled to sources of the organic acid 112, organic acid surfactant booster 114, and chemical additives such as tanks or totes to provide any combination of chemical additives.

In desalter 102 the hydrocarbon and water from mixed hydrocarbon-water stream 110 may be allowed to stratify into oil and water phases. There exists a water level in the bottom of the crude oil desalter, an emulsion containing transition zone where the volume percentages of oil and water continuously changes in a vertical direction, and a level of oil on top of the transition zone. As illustrated in FIG. 1, the separated hydrocarbons from mixed hydrocarbon-water stream 110 may exit crude oil desalter 102 as separated hydrocarbon stream 116. Separated hydrocarbon stream 116 may be conveyed to downstream processes such as a second stage desalter unit or distillation, for example. The separated water from mixed hydrocarbon-water stream 110 may exit crude oil desalter 102 as separated water stream 118. In some embodiments, separated water stream 118 may be conveyed to wastewater processing or other units configured to process the content of separated water stream 118.

Desalter 102 may include equipment to promote separation of the emulsified water droplets in the bulk emulsified layer. A first step in separation may include flocculation or aggregation of water droplets. Flocculation and aggregation may move the water droplets in the emulsion physically closer which may lead to the coalescence of the individual water drops to larger droplets. The coalesced droplets may fall out of the bulk emulsified layer by sedimentation and be incorporated into the bulk aqueous phase at the bottom of the desalter 102. Each of the processes described including flocculation, aggregation, coalescence, and sedimentation may be accelerated by equipment place within desalter 102 or as auxiliary equipment placed before or after desalter 102. Some exemplary equipment may include temperature control equipment such as heaters, shearing equipment including stirring and mixing mechanisms, filtration equipment, and electric field generators such as electrostatic grids. Although only some equipment is mentioned herein, the present disclosure should not be read to be limiting to any particular configuration of desalter as the principle of operation of the present disclosure may be applied to any desalter configuration.

Accordingly, the present disclosure provides extraction methods and systems to remove contaminants in hydrocarbon liquids and, more particularly, disclosed are synergistic additives and methods of use for metals and/or amine removal from hydrocarbon liquids. Specifically, the synergistic additives include an organic acid and an organic acid surfactant booster. The methods and systems may include any of the various features disclosed herein, including one or more of the following statements.

Statement 1. A method of contaminant removal comprising: introducing one or more organic acids and one or more organic acid surfactant boosters into a hydrocarbon liquid; and separating at least a portion of contaminants from the hydrocarbon liquid, wherein at least the one or more organic acids and/or the one or more organic acid surfactant boosters interact with the contaminants in the hydrocarbon liquid, wherein the separating removes amines from the hydrocarbon liquid in an amount of about 50% or more by weight of the hydrocarbon liquid and further removes calcium from the hydrocarbon liquid in an amount of about 30% or more by weight of the hydrocarbon liquid.

Statement 2. The method of embodiment 1, wherein the one or more organic acids comprises at least one organic acid selected from the group consisting of acetic acid, citric acid, formic acid, maleic acid, glycolic acid, oxalic acid, lactic acid, uric acid, malic acid, and tartaric acid, and any combination thereof.

Statement 3. The method of embodiment 1 or embodiment 2, wherein the one or more organic acid surfactant boosters comprise at least one surfactant selected from the group consisting of a betaine, phosphate ester, a quaternary amine, a polyol, a complex polyol ester, sulfonate, a sulfosuccinate, a thiophosphate ester, an alcohol alkoxylate, a sorbitan monooleate, and any combination thereof.

Statement 4. The method of any of embodiments 1-3, wherein the one or more organic acid surfactant boosters comprise a betaine.

Statement 5. The method of any of embodiments 1-4, wherein the one or more organic acid surfactant boosters comprise a thiophosphate ester.

Statement 6. The method of any of embodiments 1-5, wherein the hydrocarbon liquid comprises crude oil.

Statement 7. The method of any of embodiments 1-6, wherein the one or more organic acids and the one or more organic acid surfactant boosters are introduced into the hydrocarbon liquid at an organic acid to organic acid surfactant booster mole ratio of about 0.01:0.5.

Statement 8. The method of any of embodiments 1-7, wherein the one or more organic acids and the one or more organic acid surfactant boosters are separately added to the hydrocarbon liquid.

Statement 9. The method of any of embodiments 1-8, further comprising combining the one or more organic acids and the one or more organic acid surfactant boosters with water and then combining at least the water and the hydrocarbon liquid to introduce the one or more organic acids and the one or more organic acid surfactant boosters into the hydrocarbon liquid.

Statement 10. The method of any of embodiments 1-9, wherein the introducing one or more organic acids and one or more organic acid surfactant boosters comprises directly adding at least one of the one or more organic acids or the one or more organic acid surfactant boosters to the hydrocarbon liquid.

Statement 11. The method of any of embodiments 1-10, further comprising pumping the hydrocarbon liquid from a storage tank to a desalter, wherein the one or more organic acids and one or more organic acid surfactant boosters are introduced into the hydrocarbon liquid while the hydrocarbon liquid is being pumped.

Statement 12. The method of any of embodiments 1-11, wherein the separating further comprises removing salt from the hydrocarbon liquid, wherein the hydrocarbon liquid comprises crude oil.

Statement 13. The method of any of embodiments 1-12, wherein the separating removes the amines from the hydrocarbon liquid in an amount of about 80% or more by weight of the hydrocarbon liquid and removes the calcium from the hydrocarbon liquid in an amount of about 70% or more by weight of the hydrocarbon liquid.

Statement 14. A method of contaminant removal comprising: introducing one or more organic acids and one or more betaines into a water feed; combining at least the water feed and crude oil; and separating salt from the crude oil, wherein the separating salt further removes at least amines and calcium from the crude oil.

Statement 15. The method of embodiment 14, wherein the one or more betaines comprise a betaine.

Statement 16. The method of any of embodiment 14 or embodiment 15, wherein the one or more organic acids and the one or more betaines are introduced into the water at an organic acid to organic acid surfactant booster mole ratio of about 0.01:0.5

Statement 17. The method of any of embodiments 14-16, wherein the one or more organic acids and the one or more organic acid surfactant boosters are separately added to the water feed.

Statement 18. The method of any of embodiments 14-17, further comprising pumping the crude oil from a storage tank to a desalter for the separating.

Statement 19. The method of any of embodiments 14-18, wherein the separating removes the amines from the crude oil in an amount of about 80% or more by weight of the crude oil and further removes calcium from the crude oil in an amount of about 50% or more by weight of the crude oil.

Statement 20. The method of any of embodiments 14-19, wherein the separating removes the amines from the crude oil in an amount of about 90% or more by weight of the crude oil and further removes calcium from the crude oil in an amount of about 90% or more by weight of the crude oil.

EXAMPLES

To facilitate a better understanding of the present invention, the following examples of certain aspects of some embodiments are given. In no way should the following examples be read to limit, or define, the entire scope of the disclosure.

Example 1

Figure 2:
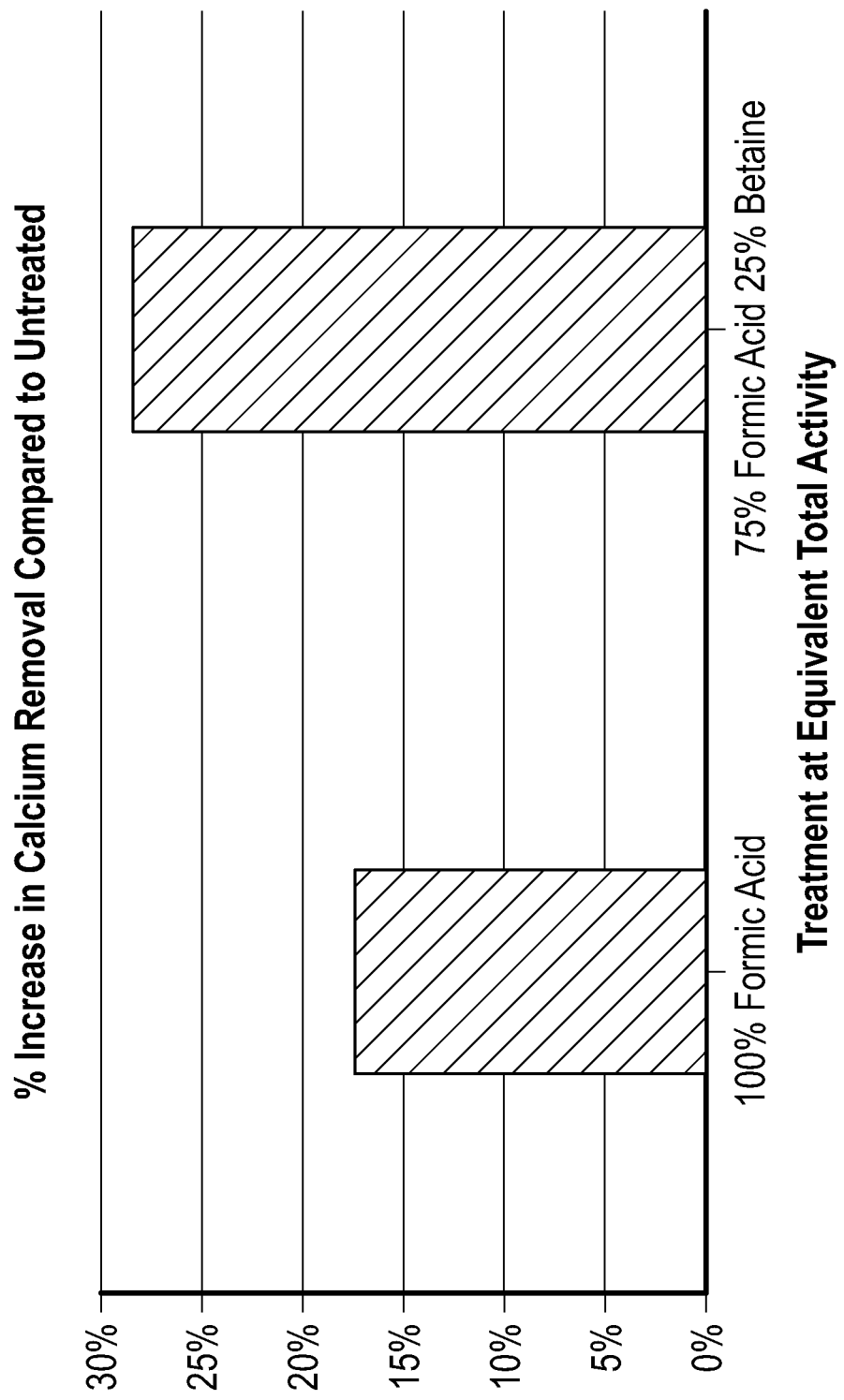
FIG. 2 is a graph illustrating the contaminant removal effectiveness of an additive in accordance with some embodiments of the present disclosure.

In this example, the contaminant removal efficacy of an organic acid (formic acid) was tested against an additive of the present disclosure, which included formic acid and a cocamidopropyl betaine. The formic acid and the cocamidopropyl betaine were included in a formic-acid-to-betaine weight ratio of 3:1. For the tests, synthetic oil were used for the initial tests in the development phase and then crude oil in confirmation testing. Crude oil or synthetic oil was poured into a bottle. Then, a blend of 500 ppm of naphthenic acid with calcium hydroxide with or without a blend of 200 ppm monoethanol amine triazine was added to the bottle and shaken. The mixture was then heated to the inlet temperature of the desalter. An aliquot of wash water with the organic acid alone or combined with about 10 ppm to about 1000 ppm of the organic acid surfactant booster with the specified weight ratio is prepared and heated to the inlet temperature of the desalter. Then, the heated aliquot is injected into the heated bottle containing the oil and the blend of naphthenic acid with calcium hydroxide. The bottle is shaken for one minute at high shear. Then, the water is allowed to separate, and samples of the water are analyzed by Ion Chromatography and Inductively Coupled Plasma Spectroscopy to determine the concentrations of amine and calcium ions. 1 mL of 37% hydrochloric acid is then added to the bottle containing the oil sample and the mixture is shaken 20 times. The distilled water is separated, and the concentrations of amine and calcium ions measured by Ion Chromatography and Inductively Coupled Plasma Spectroscopy as well. The removal efficiency is calculated as a function of mass balance of the calcium ions and monoethanol amine partitioned to the water by the organic acid alone or in combination with the organic acid surfactant booster as compared to the calcium ions and monoethanol amine partitioned to the water by an untreated sample. This test was repeated with the 3:1 mixture of formic acid and betaine. As shown in FIG. 2, the betaine and organic acid additive of the present disclosure outperformed the pure organic acid sample significantly despite treatment at equivalent total activities. The pure formic acid increases the calcium removal by 17.5% while the 75% formic acid and 25% betaine mixture increases the calcium removal by 28%.

Example 2

This example was performed to illustrate the contaminant removal efficacy of various organic acid surfactant boosters. The organic acid surfactant boosters tested were betaine, phosphate ester, quaternary amine, polyol, complex polyol ester, alcohol alkoxylate, and thiophosphate ester as shown in Column A of Table 1 below. Each organic acid surfactant booster was tested with citric acid, glycolic acid, acetic acid, and formic acid. The organic acid and organic acid surfactant booster were included in a formic-acid-to-betaine mole ratio of 19:1.

The same procedure described in Example 1 was repeated for each combination of organic acid and organic acid surfactant booster. A control sample was also tested that included pure organic acid. There additional surfactants were tested but emulsified in the organic acids so were not effective. These additional surfactants were sulfonate, sulfosuccinate, and sorbitan monooleate.

Figure 3:
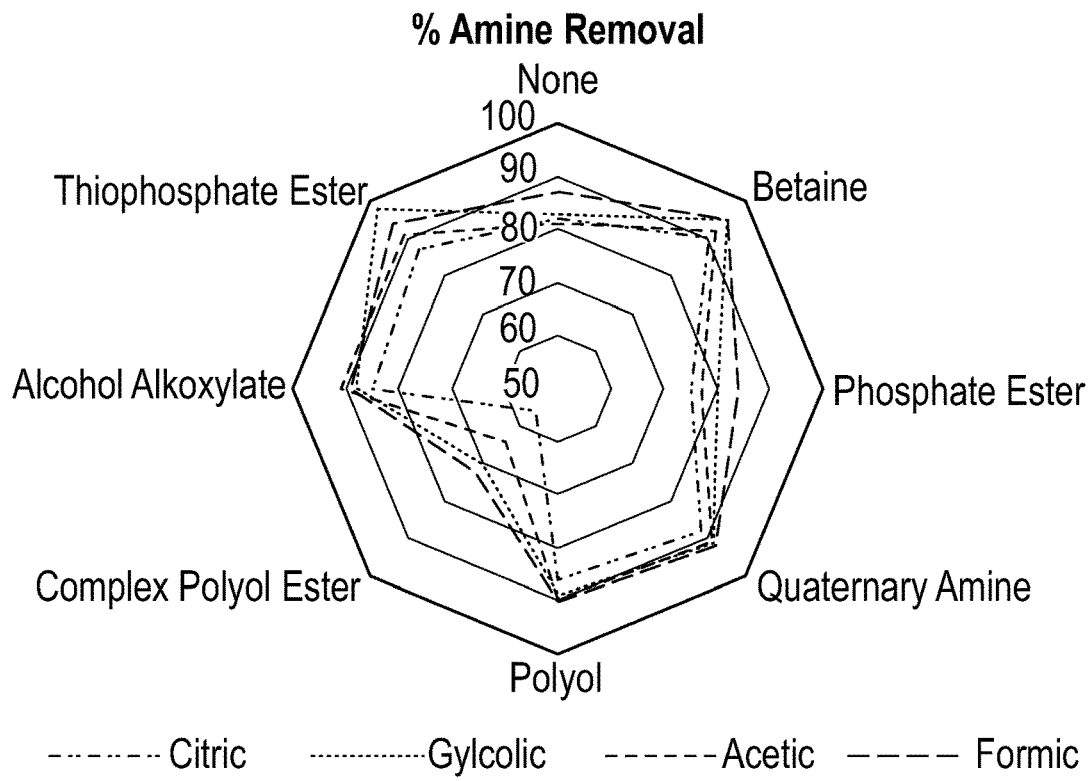
FIG. 3 is a graph illustrating the contaminant removal effectiveness for various additives in accordance with some embodiments of the present disclosure.

The percentage of amine removed from the solution was recorded as a function betaine, phosphate ester, quaternary amine, polyol, complex polyol ester, alcohol alkoxylate, and thiophosphate ester in combination with citric acid, glycolic acid, acetic acid, and formic acid, respectively. The results are provided on FIG. 3 and summarized in Table 1 below:

TABLE 1

| Column A | B Citric | C Glycolic | D Acetic | E Formic |
|---|---|---|---|---|
| None | 82% | 84% | 81% | 87% |
| Betaine | 90% | 95% | 92% | 95% |
| Phosphate Ester | 75% | 80% | 77% | 84% |
| Quaternary Amine | 88% | 92% | 91% | 92% |
| Polyol | 86% | 89% | 90% | 90% |
| Complex Polyol Ester | 56% | 70% | 64% | 72% |
| Alcohol Alkoxylate | 85% | 88% | 91% | 89% |
| Thiophosphate Ester | 87% | 98% | 91% | 94% |

Betaine, phosphate ester, quaternary amine, polyol, complex polyol ester, alcohol alkoxylate, and thiophosphate ester in column A represents 5 mol. % of the surfactant booster for 95 mol. % of citric acid in column B, 95 mol. % of glycolic acid in column C, 95 mol. % of acetic acid in column D, and 95 mol. % of formic acid in column E. The mol. % is respect to a total additive of the organic acid and organic acid surfactant booster. Therefore, the addition of 5 mol. % betaine improves the removal of amine by 8% to 11%. The addition of thiophosphate ester improves the removal of amine by 5% to 14%.

Figure 4:
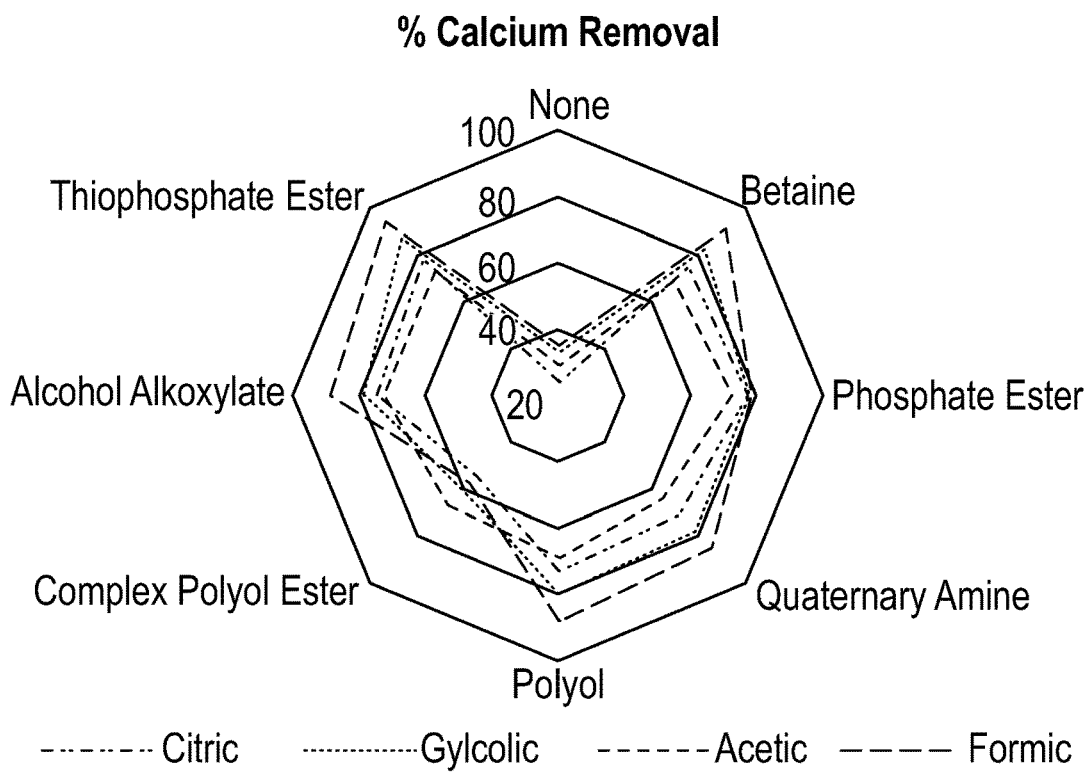
FIG. 4 is another graph illustrating the contaminant removal effectiveness for various additives in accordance with some embodiments of the present disclosure.

The percentage of calcium removed from the solution was also recorded as a function betaine, phosphate ester, quaternary amine, polyol, complex polyol ester, alcohol alkoxylate, and thiophosphate ester in combination with citric acid, glycolic acid, acetic acid, and formic acid, respectively. The results are provided in FIG. 4 and summarized in Table 2 below:

TABLE 2

| Column A | B Citric | C Glycolic | D Acetic | E Formic |
|---|---|---|---|---|
| None | 24% | 33% | 29% | 35% |
| Betaine | 75% | 82% | 69% | 91% |
| Phosphate Ester | 77% | 78% | 72% | 78% |
| Quaternary Amine | 71% | 78% | 64% | 85% |
| Polyol | 73% | 80% | 69% | 88% |
| Complex Polyol Ester | 55% | 61% | 67% | 58% |
| Alcohol Alkoxylate | 75% | 79% | 73% | 89% |
| Thiophosphate Ester | 78% | 87% | 73% | 94% |

Betaine, phosphate ester, quaternary amine, polyol, complex polyol ester, alcohol alkoxylate, and thiophosphate ester in column A represents 5 mol. % of the surfactant booster for 95 mol. % of citric acid in column B, 95 mol. % of glycolic acid in column C, 95 mol. % of acetic acid in column D, and 95 mol. % of formic acid in column E. The mol. % is calculated based upon the total amount of additive of the organic acid and organic acid surfactant booster. Therefore, the addition of 5 mol. % betaine improves the removal of calcium by 40% to 56%. The addition of thiophosphate ester improves the removal of calcium by 44% to 59%.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of contaminant removal comprising:
introducing one or more organic acids and one or more organic acid surfactant boosters into a hydrocarbon liquid, and thereafter introducing the hydrocarbon liquid into a vessel,
wherein the one or more organic acids and the one or more organic acid surfactant boosters are introduced into the hydrocarbon liquid at an organic acid to organic acid surfactant booster mole ratio of about 0.01:0.5, wherein the one or more organic acid surfactant boosters comprise at least one surfactant selected from the group consisting of a betaine, phosphate ester, a quaternary amine, a polyol, a complex polyol ester, a thiophosphate ester, an alcohol alkoxylate, and any combination thereof;
wherein the one or more organic acids comprises at least one organic acid selected from the group consisting of acetic acid, citric acid, formic acid, glycolic acid, and any combination thereof; and
separating at least a portion of contaminants from the hydrocarbon liquid in the vessel, wherein at least the one or more organic acids and/or the one or more organic acid surfactant boosters interact with the contaminants in the hydrocarbon liquid, wherein the separating removes amines from the hydrocarbon liquid in an amount of about 50% or more by weight of the hydrocarbon liquid and further removes calcium from the hydrocarbon liquid in an amount of about 30% or more by weight of the hydrocarbon liquid.

2. The method of claim 1, wherein the one or more organic acid surfactant boosters comprise a betaine.

3. The method of claim 1, wherein the one or more organic acid surfactant boosters comprise a thiophosphate ester.

4. The method of claim 1, wherein the hydrocarbon liquid comprises crude oil.

5. The method of claim 1, wherein the one or more organic acids and the one or more organic acid surfactant boosters are separately added to the hydrocarbon liquid.

6. The method of claim 1, further comprising combining the one or more organic acids and the one or more organic acid surfactant boosters with water and then combining at least the water and the hydrocarbon liquid to introduce the one or more organic acids and the one or more organic acid surfactant boosters into the hydrocarbon liquid.

7. The method of claim 1, wherein the introducing one or more organic acids and one or more organic acid surfactant boosters comprises directly adding at least one of the one or more organic acids or the one or more organic acid surfactant boosters to the hydrocarbon liquid.

8. The method of claim 1, further comprising pumping the hydrocarbon liquid from a storage tank to a desalter, wherein the one or more organic acids and one or more organic acid surfactant boosters are introduced into the hydrocarbon liquid while the hydrocarbon liquid is being pumped.

9. The method of claim 1, wherein the separating further comprises removing salt from the hydrocarbon liquid, wherein the hydrocarbon liquid comprises crude oil.

10. The method of claim 1, wherein the separating removes the amines from the hydrocarbon liquid in an amount of about 80% or more by weight of the hydrocarbon liquid and removes the calcium from the hydrocarbon liquid in an amount of about 70% or more by weight of the hydrocarbon liquid.

11. A method of contaminant removal comprising:
introducing one or more organic acids and one or more organic acid surfactant booster into a water feed, wherein the one or more organic acid surfactant boosters comprise at least one surfactant selected from the group consisting of a betaine, phosphate ester, a quaternary amine, a polyol, a complex polyol ester, a thiophosphate ester, an alcohol alkoxylate, and any combination thereof, wherein the one or more organic acids and the one or more organic acid surfactant booster are introduced into the water feed at an organic acid to organic acid surfactant booster mole ratio of about 0.01:0.5;
combining at least the water feed and crude oil and thereafter introducing the hydrocarbon liquid into a vessel; and
separating salt from the crude oil, wherein the separating salt further removes at least amines and calcium from the crude oil.

12. The method of claim 11, wherein the one or more organic acid surfactant booster comprise a cocamidopropyl betaine.

13. The method of claim 11, wherein the one or more organic acids and the one or more organic acid surfactant boosters are separately added to the water feed.

14. The method of claim 11, further comprising pumping the crude oil from a storage tank to a desalter for the separating.

15. The method of claim 11, wherein the separating removes the amines from the crude oil in an amount of about 80% or more by weight of the crude oil and further removes the calcium from the crude oil in an amount of about 50% or more by weight of the crude oil.

16. The method of claim 11, wherein the separating removes the amines from the crude oil in an amount of about 90% or more by weight of the crude oil and further removes the calcium from the crude oil in an amount of about 90% or more by weight of the crude oil.

* * * * *